(12) United States Patent
Ulbrich et al.

(10) Patent No.: US 8,874,323 B2
(45) Date of Patent: Oct. 28, 2014

(54) DEVICE AND METHOD FOR GENERATING A CONTROL SIGNAL

(75) Inventors: Nicolaus Ulbrich, Gomaringen (DE); Andreas Wienss, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 13/198,660

(22) Filed: Aug. 4, 2011

(65) Prior Publication Data

US 2012/0041646 A1 Feb. 16, 2012

(30) Foreign Application Priority Data

Aug. 13, 2010 (DE) .......................... 10 2010 039 296

(51) Int. Cl.
*G06F 17/00* (2006.01)
*B60R 21/0136* (2006.01)

(52) U.S. Cl.
CPC .................................. *B60R 21/0136* (2013.01)
USPC ............... 701/45; 701/29; 701/301; 700/282; 702/127; 373/60; 408/9; 356/171; 369/44.29; 123/435; 123/490; 355/53; 250/221; 324/71.1

(58) Field of Classification Search
USPC ............... 701/29, 45, 301; 700/282; 702/127; 373/60; 408/9; 356/71; 369/44.29; 123/435, 490; 355/53; 250/221; 324/71.1
See application file for complete search history.

(56) References Cited

U.S. PATENT DOCUMENTS

| 4,540,318 | A* | 9/1985 | Hornung et al. .................. 408/9 |
| 2004/0012773 | A1* | 1/2004 | Puttkammer .................. 356/71 |
| 2004/0105358 | A1* | 6/2004 | Watanabe et al. .......... 369/44.29 |
| 2004/0211392 | A1* | 10/2004 | Schiemann .................... 123/435 |
| 2005/0110970 | A1* | 5/2005 | Butler .............................. 355/53 |
| 2005/0182525 | A1* | 8/2005 | Laverdiere et al. ........... 700/282 |
| 2006/0069483 | A1* | 3/2006 | Hayasaka et al. .............. 701/45 |
| 2006/0069508 | A1* | 3/2006 | Yuan et al. ..................... 701/301 |
| 2006/0208169 | A1* | 9/2006 | Breed et al. .................... 250/221 |
| 2007/0233416 | A1* | 10/2007 | Jeppe ............................. 702/127 |
| 2008/0036444 | A1* | 2/2008 | Paulus et al. ................. 324/71.1 |
| 2010/0116252 | A1* | 5/2010 | Fischer et al. ................ 123/490 |
| 2010/0292887 | A1* | 11/2010 | Becker et al. ................... 701/29 |
| 2011/0040453 | A1* | 2/2011 | Doerr et al. ..................... 701/45 |
| 2011/0292961 | A1* | 12/2011 | Matschullat et al. ........... 373/60 |

FOREIGN PATENT DOCUMENTS

DE 10 2006 038 844 2/2008

* cited by examiner

*Primary Examiner* — James Trammell
*Assistant Examiner* — Sanjeev Malhotra
(74) *Attorney, Agent, or Firm* — Kenyon & Kenyon LLP

(57) ABSTRACT

A device is described for generating a control signal for controlling a passenger protection arrangement of a motor vehicle, having a first acceleration sensor for generating a first acceleration signal, having a second acceleration sensor for generating a second acceleration signal, having a first structure-borne noise sensor for generating a first structure-borne noise signal, having a second structure-borne noise sensor for generating a second structure-borne noise signal, and having an evaluation circuit, the evaluation circuit (being configured for generating a combination signal from the first structure-borne noise signal and the second structure-borne noise signal, the evaluation circuit being configured for generating the control signal as a function of the first acceleration signal, the second acceleration signal and the combination signal.

8 Claims, 3 Drawing Sheets

DEVICE AND METHOD FOR GENERATING A CONTROL SIGNAL

RELATED APPLICATION INFORMATION

The present application claims priority to and the benefit of German patent application no. 10 2010 039 296.0, which was filed in Germany on Aug. 13, 2010, the disclosure of which is incorporated herein by reference.

FIELD OF THE INVENTION

The present invention is directed to a device for generating a control signal.

BACKGROUND INFORMATION

Such devices are believed to be available or understood, including, for example, the device for triggering a passenger protection arrangement that is discussed in DE 102006038844 A1. In this device, a structure-borne noise signal is used for changing an evaluation characteristic curve of an acceleration sensor as a function of the structure-borne noise signal. However, the disadvantage of this device is that the structure-borne noise signal is influenced by comparatively great interfering signals or noise.

SUMMARY OF THE INVENTION

An object of the exemplary embodiments and/or exemplary methods of the present invention is therefore to provide a device that does not have the disadvantages of the related art.

The device according to the present invention and the method according to the present invention according to the other independent claims have the advantage over the related art that two structure-borne noise signals (dual-channel structure-borne noise sensor system) are combined and evaluated together in such a way that the combined signal is less adversely affected by interfering signals than the particular individual structure-borne noise signal.

Advantageous embodiments and refinements of the present invention may be derived from the subclaims as well as the description with reference to the drawings.

According to a refinement, it is provided that the generation of the combination signal includes a linear addition of the first structure-borne noise signal and the second structure-borne noise signal or that the generation of the combination signal includes a vector addition of the first structure-borne noise signal and the second structure-borne noise signal. This makes it advantageously possible to generate the combination signal in a comparatively simple manner.

According to another refinement, it is provided that the first acceleration sensor is configured for detection along a first axis, that the second acceleration sensor is configured for detection along a second axis, the first axis being situated perpendicularly to the second axis, the first axis and the second axis may be situated at a 45° angle to the vehicle's longitudinal axis.

According to another refinement, it is provided that the evaluation circuit includes a band pass filtering (for example, having the frequency ranges of 1 kHz to 20 kHz or 10 kHz to 12 kHz) and a formation of an RMS value, the formation of an RMS value may include an absolute value formation and low pass filtering of a linearly added combination signal or what may be a low pass filtering of a vectorially added combination signal. This makes it advantageously possible to generate the combination signal in a comparatively efficient manner.

According to another refinement, it is provided that the evaluation circuit includes an offset correction. This makes it advantageously possible to generate the combination signal in a comparatively efficient manner.

According to another refinement, it is provided that the device is designed as a microelectromechanical system. This advantageously makes a comparatively space-saving implementation possible.

Another object of the exemplary embodiments and/or exemplary methods of the present invention is a method for generating a control signal for controlling a passenger protection arrangement of a motor vehicle or for controlling game consoles, a first acceleration signal being generated, a second acceleration signal being generated, a first structure-borne noise signal being generated, a second structure-borne noise signal being generated, a combination signal being generated from the first structure-borne noise signal and the second structure-borne noise signal, the control signal being generated as a function of the first acceleration signal, the second acceleration signal and the combination signal.

According to a refinement, it is provided that the combination signal is generated by a linear addition of the first structure-borne noise signal and the second structure-borne noise signal or by a vector addition of the first structure-borne noise signal and the second structure-borne noise signal. This makes it advantageously possible to generate the combination signal in a comparatively simple manner.

According to another refinement, it is provided that the first acceleration signal is detected along a first axis, that the second acceleration signal is detected along a second axis, the first axis being situated perpendicularly to the second axis, the first axis and the second axis may be situated at a 45° angle to the vehicle's longitudinal axis. This advantageously makes a comparatively efficient plausibility check of both acceleration signals possible.

According to another refinement, it is provided that an offset correction is performed for generating the combination signal. This makes it advantageously possible to generate the combination signal in a comparatively efficient manner.

Exemplary embodiments of the present invention are represented in the drawings and are elucidated in greater detail in the following description.

DETAILED DESCRIPTION

Figure 1:
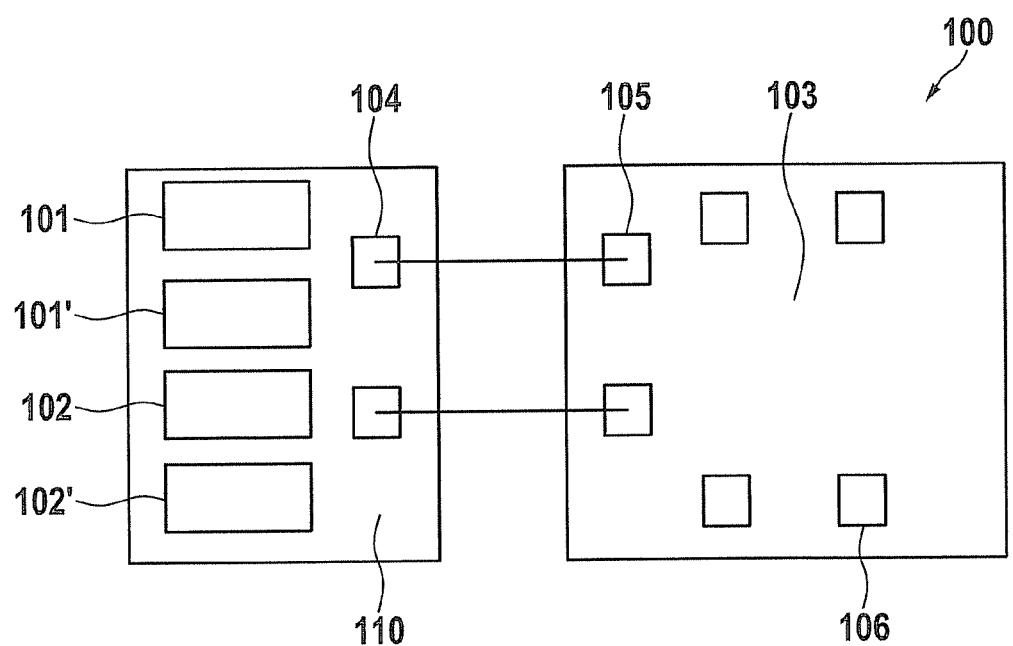
FIG. 1 schematically shows a device according to the present invention according to one exemplary specific embodiment.

Identical components are consistently provided with the same reference numerals in the various drawings and are therefore usually named or mentioned only once.

A device 100 according to the present invention according to an exemplary specific embodiment is represented schematically in FIG. 1. The device may be configured as a microelectromechanical element (MEMS). Device 100 has a substrate 110. Two acceleration sensors 101, 101' and two structure-borne noise sensors 102, 102' are situated on substrate 110, sensors 101 and 102 being implemented in a shared sensor structure and sensors 101' and 102' being implemented in another shared sensor structure in a specific embodiment. The structure-borne noise sensors may be configured as piezoelectric sensors or as capacitive sensors. Substrate 110 has a plurality of bond pads 104. Device 100 has an evaluation circuit 103. Evaluation circuit 103 has a plurality of bond pads 105 and a plurality of bond pads 106.

Substrate 110 is connected via bond pads 104 to bond pads 105 of evaluation circuit 103 for transfer of signals of the sensors. Two single channel sensor elements may be used as acceleration sensors. The acceleration sensors including their sensitive axes may be situated at a 90° angle from one another. This positioning of the acceleration sensors advantageously makes a plausibility check possible. The device according to the present invention is situated, for example, in the front of the vehicle and/or in the rear of the vehicle.

An analog voltage is transferred via bond wires 104. Evaluation circuit 103 is, for example, an ASIC or, in a specific embodiment, an ASIC having an integrated microcontroller or microprocessor. As a function of the signals, in a specific embodiment, the evaluation circuit calculates a structure-borne noise combination signal and two acceleration signals using an evaluation algorithm as described below and makes them available to another microcontroller, or according to another specific embodiment, the evaluation circuit additionally calculates a control signal from the acceleration signals and the combination signal which may cause a passenger protection arrangement such as, for example, airbags or belt tighteners to be triggered if necessary. The control signal may, however, also be used for triggering a pedestrian protection arrangement such as, for example, an external airbag. The exemplary embodiments and/or exemplary methods of the present invention are furthermore suitable for applications in game consoles, hard drives, transportation and vibration monitoring, which may be for determining impact energy.

Figure 2:
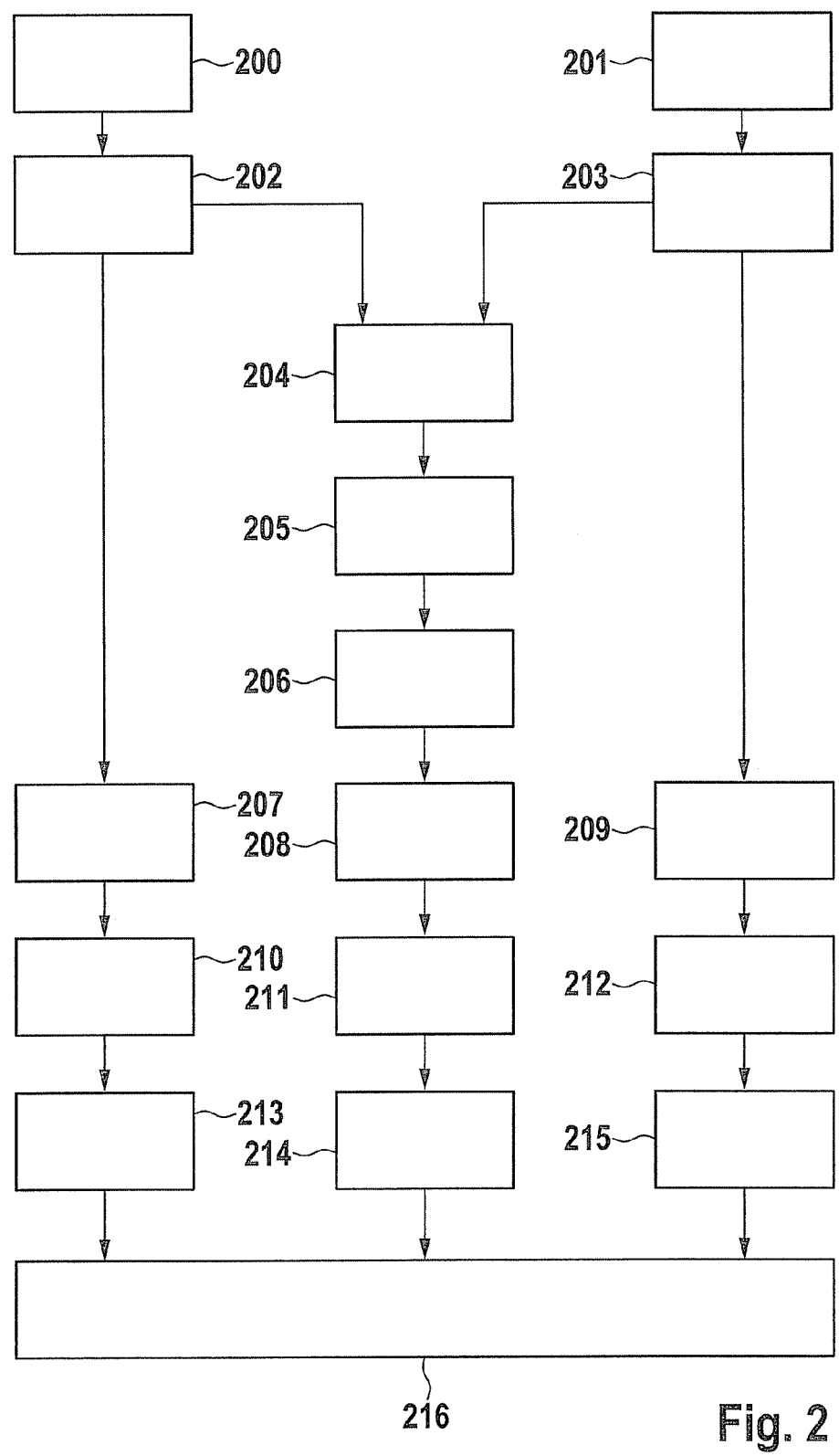
FIG. 2 shows a block diagram of the process of the method according to the present invention according to an exemplary specific embodiment.

A block diagram of a method according to the present invention according to an exemplary specific embodiment is represented in FIG. 2. In block 200, the signals (an acceleration signal and a structure-borne noise signal) of a first sensor channel (X) are processed with the aid of a capacitance to voltage converter, or in the case of a piezoelectric sensor, the signals are present as a voltage and are processed in block 200. In block 201, the signals of the first sensor channel are processed with the aid of an A/D converter. In block 201, signals (an acceleration signal and a structure-borne noise signal) of a second sensor channel (Y) are processed with the aid of a capacitance to voltage converter, or in the case of a piezoelectric sensor, the signals are present as a voltage and are processed in block 201. In block 203, the signals of the second sensor channel are processed with the aid of an A/D converter. In block 204, the two signals of the structure-borne noise sensors are combined, for example, by linear addition x+y or vector addition $(x^2+y^2)^{(1/2)}$. In block 205, a band pass is used for selecting the frequency band in which the structure-borne noise signals are to be evaluated (for example: 1 kHz to 20 kHz). Alternatively, it is also possible for the signals to be combined in block 204 only after band pass 205 is applied. An absolute value is generated in block 206 (necessary only in the case of a linear addition) and decimation filtering may occur in block 208. A low pass filtering occurs in block 211 (block 206+208+211 reflects the formation of an RMS value). An offset correction may occur in block 214 (deduction of the offset resulting from noise). The offset correction is, for example, linear (tp(abs(bp(x+y)))−noise floor) or quadratic $(((tp(abs(bp(x+y))))^2-noise\ floor\ ^2)^{(1/2)})$. In this case, tp represents low pass, by represents band pass and abs represents absolute value formation. The noise offset (noise floor) may, for example, be ascertained using a sufficiently large time window (for example, 1 s). In block 207, a decimation filter is applied to the first acceleration signal in a conventional manner, followed by a low pass in block 210 and an offset regulation in block 213. In block 209, a decimation filter is applied to the second acceleration sensor signal in a conventional manner, followed by a low pass in block 212 and an offset regulation in block 215.

In a specific embodiment, the three generated signals (two acceleration signals and the combined structure-borne noise signal) together are made available to an external control unit via a data bus in block 216 or are evaluated as a combined control signal in another specific embodiment. Based on a combined evaluation of the acceleration signal and the structure-borne noise signal, passenger protection systems such as airbags or belt tighteners are triggered, for example when a crash is detected.

Figure 3:
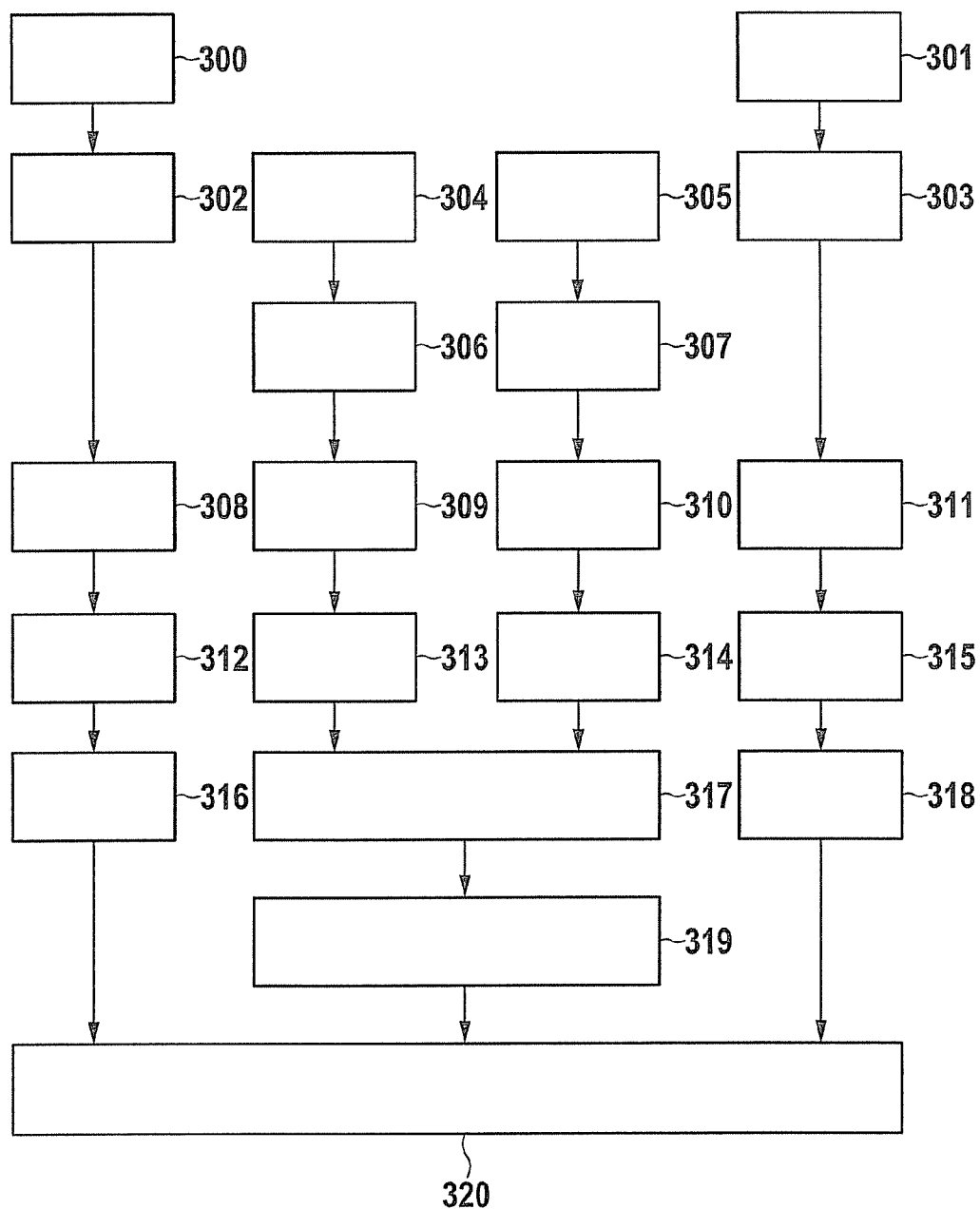
FIG. 3 shows a block diagram of the process of the method according to the present invention according to another exemplary specific embodiment.

A block diagram of a method according to the present invention according to another exemplary specific embodiment is represented in FIG. 3. In block 300, signals (an acceleration signal and a structure-borne noise signal) of a first sensor channel (X) are processed with the aid of a capacitance to voltage converter, or in the case of a piezoelectric sensor, the signals are present as a voltage and are processed in block 300. In block 302, the signals of the first sensor channel are processed with the aid of an A/D converter. In block 301, signals (an acceleration signal and a structure-borne noise signal) of a second sensor channel (Y) are processed with the aid of a capacitance to voltage converter, or in the case of a piezoelectric sensor, the signals are present as a voltage and are processed in block 301. In block 303, the signals of the second sensor channel, are processed with the aid of an A/D converter. A band pass is applied to the first structure-borne noise signal in block 304.

An absolute value formation is applied to the first structure-borne noise signal in block 306. A decimation filter is applied to the first structure-borne noise signal in block 309. A low pass is applied to the first structure-borne noise signal in block 313. A band pass is applied to the second structure-borne noise signal in block 305. An absolute value formation is applied to the second structure-borne noise signal in block 307. A decimation filter is applied to the second structure-borne noise signal in block 310. A low pass is applied to the second structure-borne noise signal in block 314. In block 317, the first structure-borne noise signal and the second structure-borne noise signal are combined, for example, by linear addition. An offset correction (as described in FIG. 2) occurs in block 319. In block 308, a decimation filter is applied to the first acceleration signal in a conventional manner, followed by a low pass in block 312 and an offset regulation in block 316. In block 311, a decimation filter is applied to the second acceleration signal in a conventional manner, followed by a low pass in block 315 and an offset regulation in block 318. In a specific embodiment, the three signals (two acceleration signals and a combined structure-borne noise signal) are made available to an external control unit via a data bus in block 320 or are evaluated as a combined control signal in another specific embodiment. Based on a combined evaluation of the acceleration signal and the structure-borne noise signal, passenger protection systems such as airbags or belt tighteners are triggered, for example, when a crash is detected.

Moreover, reference is made to FIG. 2.

What is claimed is:

1. A device for generating a control signal for controlling a passenger protection arrangement of a motor vehicle or for controlling game consoles, comprising:
   a first acceleration sensor for generating a first acceleration signal;
   a second acceleration sensor for generating a second acceleration signal;

a first structure-borne noise sensor for generating a first structure-borne noise signal;

a second structure-borne noise sensor for generating a second structure-borne noise signal;

an evaluation circuit, wherein the evaluation circuit is configured for generating a combination signal from the first structure-borne noise signal and the second structure-borne noise signal, wherein the evaluation circuit is configured for generating the control signal as a function of the first acceleration signal, the second acceleration signal and the combination signal, and wherein the evaluation circuit is an ASIC having an integrated microcontroller or microprocessor; and wherein the generation of the combination signal includes a linear addition of the first structure-borne noise signal and the second structure-borne noise signal or the generation of the combination signal includes a vector addition of the first structure-borne noise signal and the second structure-borne noise signal.

2. The device of claim 1, wherein the first acceleration sensor is configured for generating a first acceleration signal and the first structure-borne noise sensor is configured for generating a first structure-borne noise signal in a shared first sensor structure, and the second acceleration sensor is configured for generating a second acceleration signal and the second structure-borne noise sensor is configured for generating a second structure-borne noise signal in a shared second sensor structure.

3. The device of claim 1, wherein the first acceleration sensor is configured for detection along a first axis, the second acceleration sensor is configured for detection along a second axis, wherein the first axis is situated perpendicularly to the second axis, and wherein the first axis and the second axis are situated at a 45° angle to the vehicle's longitudinal axis.

4. The device of claim 1, wherein the evaluation circuit includes a band pass filtering and formation of an RMS value, and wherein the formation of an RMS value includes an absolute value formation and low pass filtering of one of a linearly added combination signal and a low pass filtering of a vectorially added combination signal.

5. The device of claim 1, wherein the evaluation circuit includes an offset correction.

6. The device of claim 1, wherein the device is a microelectromechanical system.

7. A method for generating a control signal for controlling personal protection arrangement of a motor vehicle or game consoles, the method comprising:

generating a first acceleration signal; generating a second acceleration signal;

generating a first structure-borne noise signal;

generating a second structure-borne noise signal;

generating a combination signal from the first structure-borne noise signal and the second structure-borne noise signal, wherein the control signal is generated as a function of the first acceleration signal, the second acceleration signal and the combination signal, and wherein the evaluation circuit is an ASIC having an integrated microcontroller or microprocessor; and wherein the combination signal is generated by one of (i) a linear addition of the first structure-borne noise signal and the second structure-borne noise signal, and (ii) by a vector addition of the first structure-borne noise signal and the second structure-borne noise signal.

8. The method of claim 7, wherein the first acceleration signal is detected along a first axis, wherein the second acceleration signal is detected along a second axis, wherein the first axis is situated perpendicularly to the second axis, and wherein the first axis and the second axis are situated at a 45° angle to the vehicle's longitudinal axis.

* * * * *